(12) United States Patent
Jeon et al.

(10) Patent No.: US 11,790,552 B2
(45) Date of Patent: Oct. 17, 2023

(54) METHOD FOR APPLYING MULTI-COMPONENT CURABLE COMPOSITION

(71) Applicant: FINE SEMITECH CORP., Hwaseong-si (KR)

(72) Inventors: Sung Chul Jeon, Osan-si (KR); Dong Young Shin, Osan-si (KR); Sun Woo Lee, Osan-si (KR)

(73) Assignee: FINE SEMITECH CORP., Hwaseong-si (KR)

( * ) Notice: Subject to any disclaimer, the term of this patent is extended or adjusted under 35 U.S.C. 154(b) by 110 days.

(21) Appl. No.: 17/476,997

(22) Filed: Sep. 16, 2021

(65) Prior Publication Data
US 2022/0262028 A1    Aug. 18, 2022

(30) Foreign Application Priority Data
Feb. 18, 2021 (KR) .......... 10-2021-0021834

(51) Int. Cl.
| | | |
|---|---|---|
| *B32B 41/00* | (2006.01) | |
| *G06T 7/62* | (2017.01) | |
| *B05D 5/10* | (2006.01) | |
| *C09J 5/00* | (2006.01) | |
| *G01B 11/06* | (2006.01) | |
| *G06T 7/00* | (2017.01) | |

(52) U.S. Cl.
CPC .......... *G06T 7/62* (2017.01); *B05D 5/10* (2013.01); *C09J 5/00* (2013.01); *G01B 11/0608* (2013.01); *G06T 7/0004* (2013.01); *G06T 2207/30108* (2013.01)

(58) Field of Classification Search
CPC .......... G06T 7/62; G06T 7/0004; G06T 2207/30108; G06T 2207/30164; B05D 5/10; B05D 1/36; C09J 5/00; G01B 11/0608; G01B 11/24; G01B 2210/50; G01B 11/00; G01B 11/06; B05C 5/0208; B05C 11/1018; B05C 11/1021; B05C 11/1039; B05C 5/00
USPC .................. 156/60, 64, 350, 351, 378, 379
See application file for complete search history.

(56) References Cited

U.S. PATENT DOCUMENTS

| | | | |
|---|---|---|---|
| 6,713,389 B2 * | 3/2004 | Speakman | H10N 10/01 438/30 |
| 2017/0228882 A1 * | 8/2017 | Dillingham | G01N 13/02 |

FOREIGN PATENT DOCUMENTS

| | | |
|---|---|---|
| CN | 108212674 A | 6/2018 |
| CN | 112368917 A | 2/2021 |
| JP | 2019-098285 A | 6/2019 |

(Continued)

*Primary Examiner* — Michael N Orlando
*Assistant Examiner* — Joshel Rivera
(74) *Attorney, Agent, or Firm* — NKL LAW; Jae Youn Kim

(57) ABSTRACT

An apparatus and method for applying a multi-component curable composition is disclosed. The method for applying a multi-component curable composition includes a) applying a plurality of fluids constituting the multi-component curable composition to a surface of a bonding target object layer by layer, b) acquiring a two-dimensional image of all the fluids applied layer by layer using an image sensor, c) measuring a height of all the fluids applied layer by layer using a distance sensor, and d) calculating a total volume of the multi-component curable composition by using the two-dimensional image and height of the fluids obtained in b) and c).

3 Claims, 3 Drawing Sheets

(56) References Cited

FOREIGN PATENT DOCUMENTS

| | | |
|---|---|---|
| KR | 10-0915047 B1 | 9/2009 |
| KR | 10-1404224 B1 | 6/2014 |
| KR | 10-2017-0085118 A | 7/2017 |
| KR | 10-2018-0066935 A | 6/2018 |
| KR | 10-2021-0008090 A | 1/2021 |
| WO | WO-2018204791 A1 * 11/2018 | ............ B41J 2/2142 |

* cited by examiner

METHOD FOR APPLYING MULTI-COMPONENT CURABLE COMPOSITION

TECHNICAL FIELD

The present invention relates to a method for applying a multi-component curable composition and, more particularly, to a method for applying a multi-component curable composition, in which individual fluids constituting a multi-component curable composition are applied layer by layer without mixing the fluids in advance.

BACKGROUND ART

A multi-component curable composition is a type of adhesive, and is used in such a way that reactive components to be cured upon mixing are stored separately, mixed when necessary, and applied to a bonding target object. For example, a two-component acrylic adhesive composed of a main material and a curing agent is used.

Recently, there is available a method of applying a small amount of a multi-component curable composition on a small part over an area of about several mm in diameter and then bringing the part into contact with a target object to thereby attach the part.

For example, Korean Patent Application Publication No. 10-2017-0085118 discloses a method of attaching studs to a patterning device (reticle) through the steps of arranging studs on stud manipulators, applying an adhesive to the studs, arranging a patterning device on the studs with the patterned surface facing downwards, moving the studs so as to make contact with the patterning device by moving the stud manipulators upward, and heating the studs on the stud manipulators using heaters. In the step of applying the adhesive to the studs, a multi-component curable composition may be used as the adhesive.

As a device for applying such a multi-component curable composition to a bonding target object, dispenser devices have been developed and used.

For example, Korean Patent No. 10-1404224 discloses dispenser devices in which an adhesive and a curing agent discharged from first and second reservoirs are mixed by a spiral mixer and then dispensed.

However, in these dispenser devices, curing proceeds immediately after the main material and the curing agent are mixed by the mixer. Therefore, it is difficult to store the multi-component curable composition remaining in the dispenser devices. It is also difficult to perform a continuous operation. In addition, it is difficult to accurately control the amount of application due to the change in viscosity caused by the curing.

For this reason, it is difficult to realize automation. Therefore, it is required that an experienced operator checks an average amount of a multi-component curable composition discharged at a time while discharging the multi-component curable composition several to tens of times through a dispenser device immediately before application, and then manually applies the multi-component curable composition.

PRIOR ART DOCUMENTS

Patent Documents

Korean Patent No. 10-1404224
Korean Patent No. 10-0915047
Korean Patent Application Publication No. 10-2017-0085118
Korean Patent Application Publication No. 10-2018-0066935
Korean Patent Application Publication No. 10-2021-0008090

SUMMARY

An object of the present invention is to provide an apparatus and method for applying a multi-component curable composition, which is capable of easily controlling an amount of application of a multi-component curable composition.

In order to achieve the above object, the present invention provides a method for applying a multi-component curable composition, including: a) applying a plurality of fluids constituting the multi-component curable composition to a surface of a bonding target object layer by layer; b) acquiring a two-dimensional image of all the fluids applied layer by layer using an image sensor; c) measuring a height of all the fluids applied layer by layer using a distance sensor; and d) calculating a total volume of the multi-component curable composition by using the two-dimensional image and height of the fluids obtained in b) and c).

In the method, in a), the fluids may be applied in an aligned state in which the centers of the fluids coincide with each other.

The method may further include: measuring an area of the applied fluid using the image sensor in a state in which only a part of the fluids is applied; measuring a height of the applied fluid using the distance sensor in a state in which only a part of the fluids is applied; and calculating a volume of the applied fluid using the area and height of the applied fluid.

The method may further include: calculating a volume of an additionally applied fluid by using a difference between the total volume of the multi-component curable composition calculated in d) and the volume of the applied fluid.

In the method of applying a multi-component curable composition according to the present invention, it is easy to store the multi-component curable composition because the respective fluids constituting the multi-component curable composition are not mixed in advance.

Since the respective fluids constituting the multi-component curable composition are not mixed in advance, there is no change in viscosity due to curing. Therefore, it is possible to accurately control the amount of application.

In addition, there is an advantage in that it is easy to realize a continuous operation and automation.

DETAILED DESCRIPTION

Figure 1:
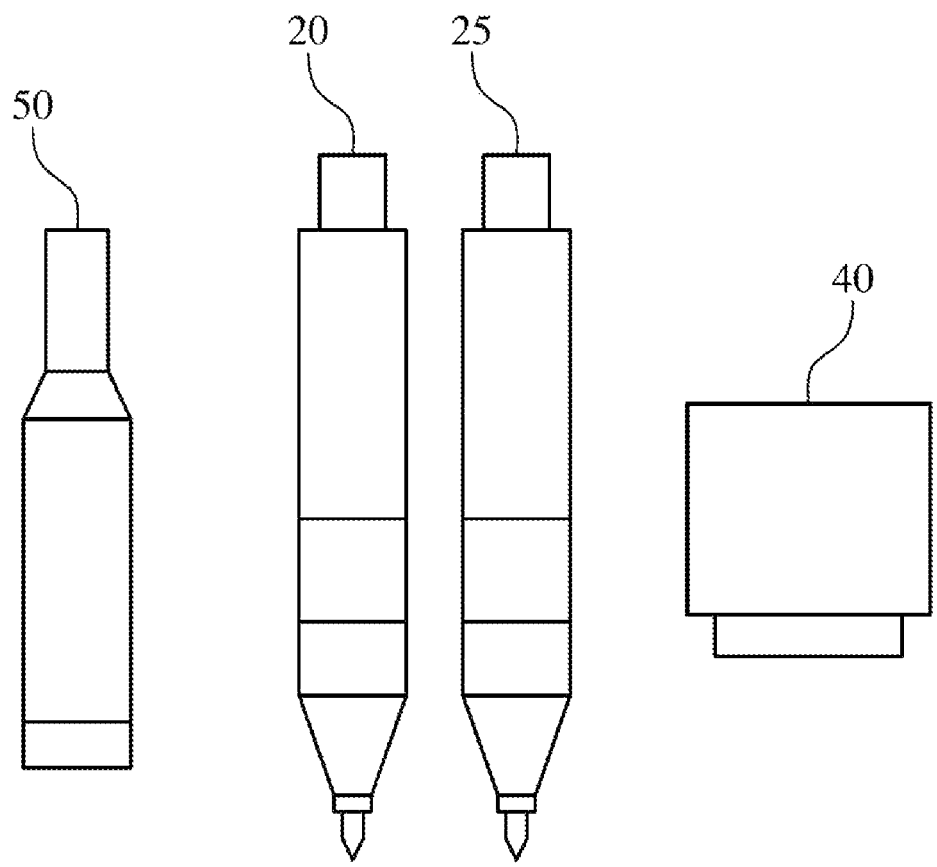
FIG. 1 is a conceptual diagram of an apparatus for applying a multi-component curable composition according to an embodiment of the present invention.

Hereinafter, embodiments of the present invention will be described in detail with reference to the accompanying drawings.

The following embodiments are provided by way of example in order to sufficiently convey the spirit of the present invention to those skilled in the art. Therefore, the present invention is not limited to the embodiments described below and may be embodied in other forms. In the drawings, the width, length, thickness and the like of each component may be exaggerated for the sake of convenience. Like reference numerals indicate the same elements throughout the specification.

FIG. 1 is a conceptual diagram of an apparatus for applying a multi-component curable composition according to an embodiment of the present invention. As shown in FIG. 1, the apparatus 100 for applying a multi-component curable composition according to an embodiment of the present invention includes a support means 10 configured to support a bonding target object 1, two dispensers 20 and 25, an alignment means 30, an image sensor 40, a distance sensor 50 and a controller.

The apparatus for applying a multi-component liquid curable composition according to the present invention is configured to apply individual fluids constituting a multi-component curable composition to the surface of the bonding target object 1 layer by layer through the use of separate dispensers 20 and 25. Then, the volumes of the applied individual fluids and/or the volume of the applied multi-component curable composition are measured using the image sensor 40, the distance sensor 50 and the controller.

In this embodiment, by way of example, there will be described a case where a stud is used as the bonding target object 1 and a two-component adhesive is used as the multi-component curable composition. The two-component adhesive contains a main material and a curing agent as constituent fluids. When using a three-component or more curable composition, dispensers suitable for the number of fluids are required. For example, when using a three-component curable composition, three dispensers are required.

The support means 10 may have various shapes depending on the shape of the bonding target object 1. When a stud is used as the bonding target object 1, a stud manipulator having a groove into which the stud is inserted may be used as the support means 10.

The two dispensers 20 and 25 serve to apply a main material and a curing agent, respectively. As the dispensers, various known dispensers, such as volumetric (mechanical) dispensers, plunger type dispensers, tubing type dispensers, air pulse type dispensers, piezoelectric dispensers and the like may be used. In this embodiment, the first dispenser 20 stores the main material, and the second dispenser 25 stores the curing agent.

The alignment means 30 serves to adjust the relative positions of the dispensers 20 and 25 and the bonding target object 1 so that the first dispenser 20 and the second dispenser 25 can apply the main material and the curing agent layer by layer at the same position on the bonding target object 1. The alignment means 30 may be a transfer means capable of adjusting the position of the bonding target object 1 or the position of at least one dispenser. In this embodiment, the alignment means 30 is configured to adjust the position of the bonding target object 1 fixed to the support means 10.

The image sensor 40 is used to acquire two-dimensional images of the fluids which are applied to the surface of the bonding target object 1 by the dispensers 20 and 25. The image sensor 40 may acquire a two-dimensional image of the curing agent applied to the surface of the bonding target object 1 and a two-dimensional image of the main material applied on the curing agent. Conversely, when the main material is first applied, the image sensor 40 may acquire a two-dimensional image of the applied main material and a two-dimensional image of the curing agent applied on the main material.

As the image sensor 40, a CCD image sensor or a CMOS image sensor may be used. When the two-dimensional image of the applied fluid secured through the image sensor 40 is analyzed by a program installed in the controller, the diameter and center coordinates of the applied fluid can be measured.

The distance sensor 50 is used to measure the height of the applied fluid. As the distance sensor 50, a non-contact distance sensor such as a confocal sensor or the like may be used. The distance sensor 50 measures the maximum height of the applied fluid. In addition, the distance sensor 50 may measure a position-dependent height change profile of the fluid.

The controller calculates the volume of the applied fluid by using the two-dimensional image of the fluid and the height of the fluid measured by the image sensor 40 and the distance sensor 50. The controller includes hardware such as a CPU, a memory, a storage device and the like, and a program installed in the storage device.

Hereinafter, an embodiment of a method for applying a multi-component curable composition using the aforementioned apparatus for applying a multi-component curable composition will be described.

Figure 2:
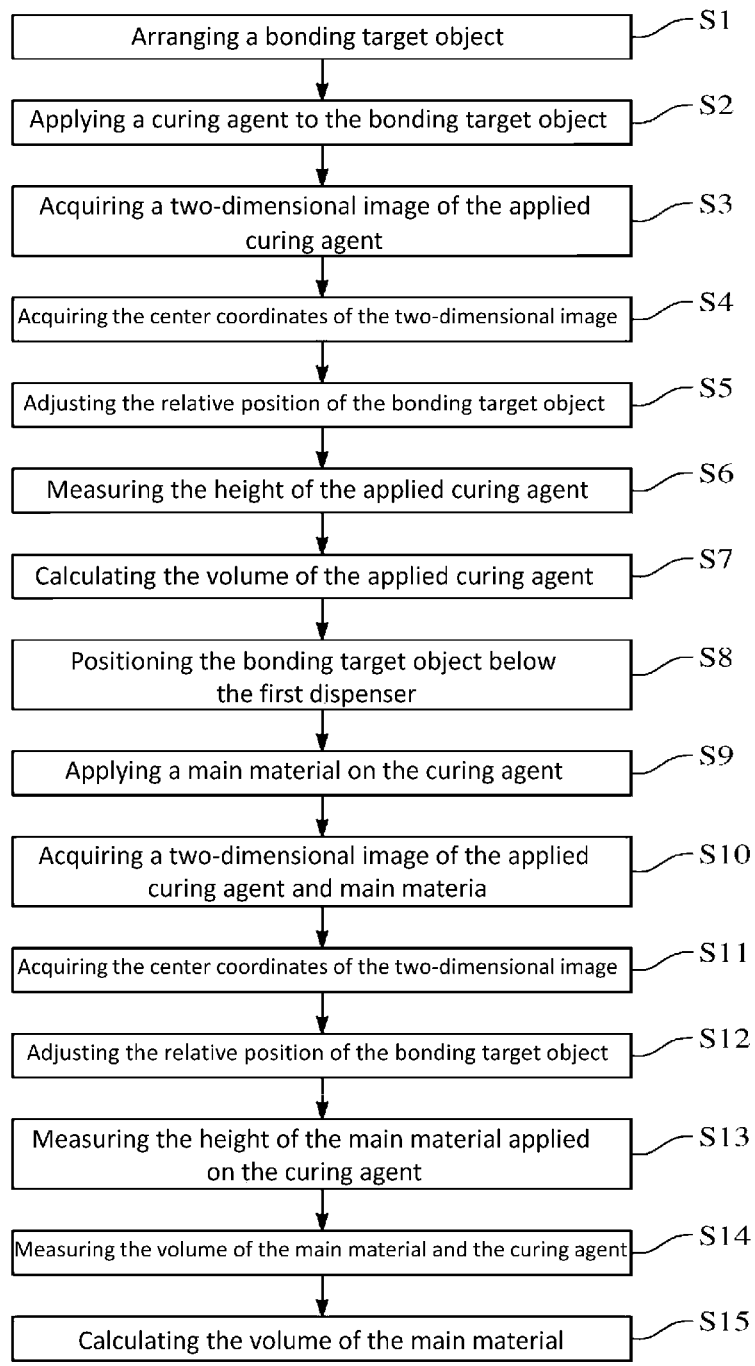
FIG. 2 is a flowchart of a method of applying a multi-component curable composition according to an embodiment of the present invention.

As shown in FIG. 2, the method for applying a multi-component curable composition begins with a step of arranging the bonding target object 1 on the support means 10 (S1).

Next, a curing agent is applied to the bonding target object 1 using the second dispenser 25 (S2).

Next, a two-dimensional image of the applied curing agent is obtained using the image sensor 40 (S3).

Next, the center coordinates of the two-dimensional image are obtained (S4).

Next, the relative position of the bonding target object 1 is adjusted using the center coordinates of the two-dimensional image so that the center of the applied curing agent is positioned in the measurement range of the distance sensor 50 (S5).

Next, the height of the applied curing agent is measured using the distance sensor 50 (S6).

Next, the controller calculates the volume of the curing agent using the two-dimensional image and height of the applied curing agent (S7). The volume of the curing agent may be calculated using the maximum height of the curing agent, and if necessary, the volume of the curing agent may be calculated using a position-dependent height profile or a radial height profile of the curing agent.

For example, it is possible to calculate the volume V of the curing agent using the following equation. In the equation, h denotes the maximum height of the curing agent, and r denotes the diameter of the curing agent.

$$V = \frac{1}{3}\pi h^2 (3r - h)$$

Next, the position of the support means 10 is moved by the alignment means 30 to locate the bonding target object 1 under the first dispenser 20 (S8).

Next, a main material is applied on the curing agent using the first dispenser 20 (S9).

At this time, the center of the applied main material and the center of the applied curing agent coincide with each other.

Next, a two-dimensional image of the applied curing agent and main material is obtained using the image sensor 40 (S10).

Next, the center coordinates of the two-dimensional image are acquired (S11).

Next, the relative position of the bonding target object 1 is adjusted using the center coordinates of the two-dimensional image so that the center of the applied curing agent and main material is located in the measurement range of the distance sensor 50 (S12).

Next, the height of the main material applied on the curing agent (the total height of the curing agent and the main material) is measured using the distance sensor 50 (S13).

Next, the controller calculates the volume of the main material and curing agent using the two-dimensional image of the applied curing agent and main material and the height of the main material (S14).

Next, the volume of the main material is calculated using the difference between the total volume of the main material and curing agent calculated in step S14 and the volume of the curing agent calculated in step S7 (S15).

If the volume of the main material and curing agent falls within a specified range, the bonding target object 1 is attached by bringing the bonding target object 1 into close contact with the surface of an attachment target object and then applying a pressure to the bonding target object. If necessary, heat may also be applied.

When the bonding target object 1 is brought into close contact with the surface of the attachment target object in a state in which the main material and the curing agent are applied layer by layer, the main material and the curing agent are thinly spread out so that a reaction occurs at the interface between the main material and the curing agent, whereby curing proceeds.

The adhesive strength of the adhesive can be controlled by adjusting the temperature and pressure conditions in the curing step. Accordingly, it is possible to partially control the residual amount of the adhesive when the bonding target object 1 is detached, and the residual can be more easily removed.

Hereinafter, another embodiment of the method of applying a multi-component curable composition using the apparatus 100 for applying a multi-component curable composition will be described.

Figure 3:
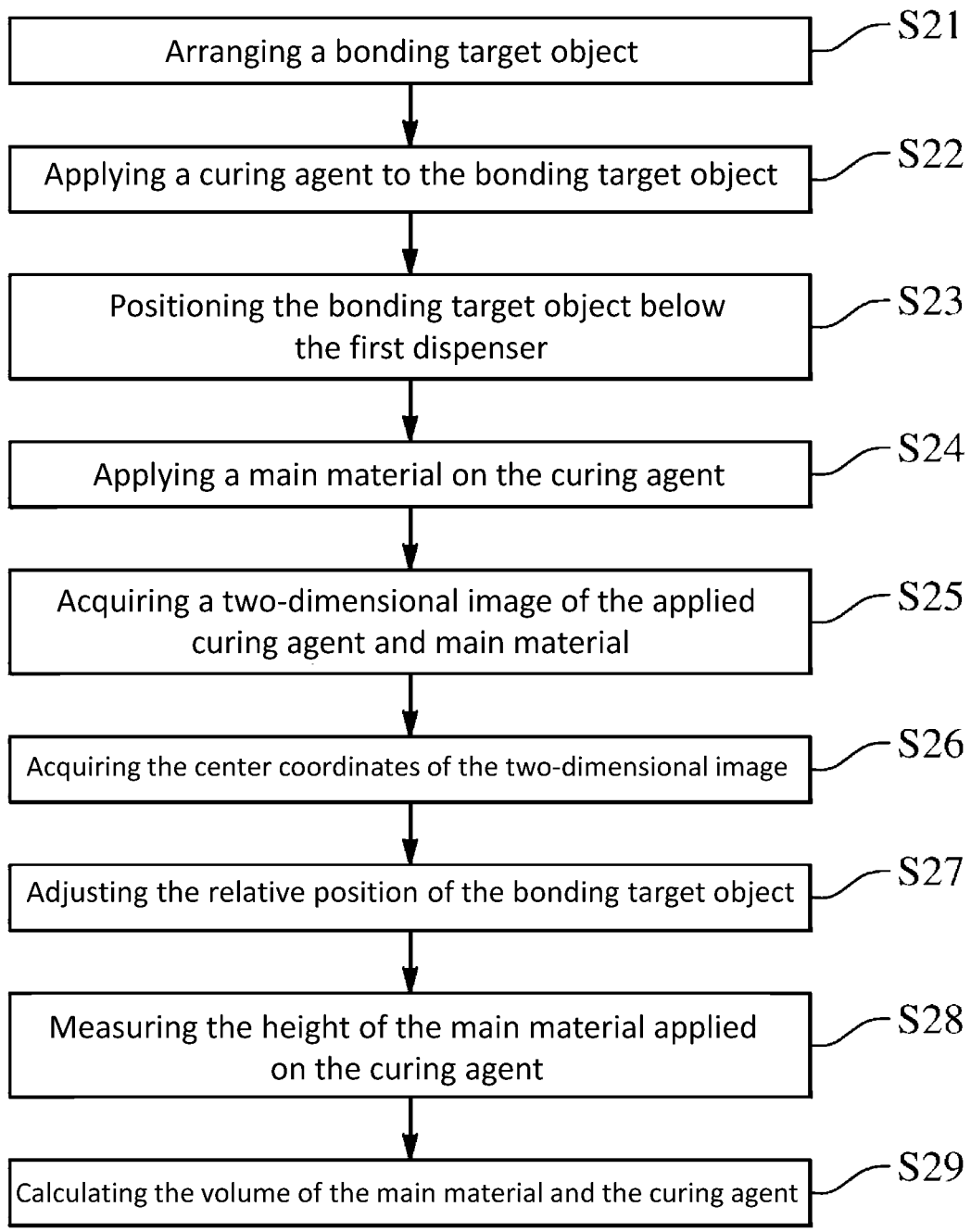
FIG. 3 is a flowchart of a method of applying a multi-component curable composition according to another embodiment of the present invention.

As shown in FIG. 3, the method for applying a multi-component curable composition according to this embodiment begins with a step of arranging the bonding target object 1 on the support means 10 (S21).

Next, a curing agent is applied to the bonding target object 1 using the second dispenser 25 (S22).

Next, the position of the support means 10 is moved using the alignment means 30, and the bonding target object 1 is positioned under the first dispenser 20 (S23).

Next, a main material is applied on the curing agent using the first dispenser 20 (S24). At this time, the center of the applied main material and the applied curing agent coincide with each other.

Next, a two-dimensional image of the applied curing agent and main material is obtained using the image sensor 40 (S25).

Next, the center coordinates of the two-dimensional image are acquired (S26).

Next, the relative position of the bonding target object 1 is adjusted using the center coordinates of the two-dimensional image so that the center of the applied curing agent and main material is located in the measurement range of the distance sensor 50 (S27).

Next, the height of the main material applied on the curing agent is measured using the distance sensor 50 (S28).

Next, the controller calculates the volume of the main material and curing agent using the two-dimensional image of the applied curing agent and main material and the height of the main material (S29).

This embodiment is different from the embodiment shown in FIG. 2 in that the steps for measuring the volume of the curing agent (steps S3 to S7) are omitted. In addition, the step for calculating the volume of the main material (step S15) is also omitted.

In this embodiment, instead of omitting the steps for measuring the volume of the curing agent in the step of applying the curing agent to the surface of the bonding target object 1, the amount of application of the fluid according to the set conditions of the dispenser, such as a fluid heating temperature or a fluid discharging pressure, is measured in advance.

The amount of application may be measured through steps S3 to S7 of FIG. 2, or may be measured by applying the curing agent several tens of times through the use of the dispenser, measuring the weight of the curing agent and then dividing the weight of the curing agent by the number of applications. Since the amount of one application is very small, the weight of the curing agent is measured after applying the curing agent several tens of times. The volume can be calculated using the density of the curing agent.

In the present invention, since the main material and the curing agent are not mixed in the dispensers, if the set conditions are assumed to be the same, the amounts of the main material and the curing agent discharged through the dispensers are hardly changed. Therefore, a table of application amount data according to the set conditions of the dispenser can be secured in advance.

While the preferred embodiments of the present invention have been shown and described above, the present invention is not limited to the specific embodiments described above. It will be apparent to those skilled in the art that various modifications may be made without departing from the spirit of the present invention recited in the claims. These modifications should not be understood separately from the technical idea or perspective of the present invention.

For example, in the above-described embodiments, the description has been made on the case where the two-component curable composition is used. However, the present invention may also be applied to a curable composition using three or more fluids. Even when three or more fluids are used, as in the embodiment shown in FIG. 2, the volume of the applied fluid may be measured each time when the fluid is applied, or as in the embodiment shown in FIG. 3, the volume may be measured after all the fluids are applied. In addition, instead of measuring the volume each time, it may be possible to measure the volume after some fluids are applied.

Description of Reference Numerals

100: apparatus for applying a multi-component curable composition, 1: bonding target object, 10: support means, 20: first dispenser, 25: second dispenser, 30: alignment means, 40: image sensor, 50: distance sensor

What is claimed is:

1. A method for applying a multi-component curable composition, comprising:

applying a plurality of fluids constituting the multi-component curable composition to a surface of a bonding target object layer by layer so that the plurality of fluids are applied to the surface as an entire fluid;

acquiring a two-dimensional image of the entire fluid applied layer by layer using an image sensor;

measuring, from the acquired two-dimensional image, a diameter of the entire fluid applied layer by layer;

measuring a height of the entire fluid applied layer by layer using a distance sensor; and calculating a total volume of the multi-component curable composition by using both the diameter and the height of the entire fluid, wherein the method further comprising:

in a state in which only a part of the entire fluid is applied, measuring an area of the applied part using the image sensor and measuring a height of the applied part using the distance sensor;

calculating a volume of the applied part using the area and height of the applied part; and calculating a volume of an additionally applied part by using a difference between the calculated total volume of the multi-component curable composition and the calculated volume of the applied part.

2. The method according to claim 1, wherein when applying the plurality of fluids to the surface of the bonding target object, the fluids are applied in an aligned state in which the centers of the fluids coincide with each other.

3. The method according to claim 1, wherein the total volume of the multi-component curable composition is calculated by using predetermined variables, and the predetermined variables are consisting of the height and diameter of the entire fluid.

* * * * *